US005449477A

United States Patent [19]

Eckhardt

[11] Patent Number: 5,449,477

[45] Date of Patent: * Sep. 12, 1995

[54] BLEACH DISPERSION OF LONG SHELF LIFE

[75] Inventor: Claude Eckhardt, Riedisheim, France

[73] Assignee: Ciba-Geigy Corporation, Ardsley, N.Y.

[ * ] Notice: The portion of the term of this patent subsequent to Jul. 5, 2011 has been disclaimed.

[21] Appl. No.: 991,661

[22] Filed: Dec. 16, 1992

[30] Foreign Application Priority Data

Dec. 19, 1991 [CH] Switzerland ........................ 3777/91

[51] Int. Cl.$^6$ ........................ C01B 15/00; C09K 11/06

[52] U.S. Cl. ........................ 252/186.1; 252/186.22; 252/186.42; 252/186.43; 252/186.38; 252/301.21; 252/301.32; 252/95

[58] Field of Search ........................ 252/301.21, 301.32, 252/186.1, 186.21, 186.42, 186.43, 186.38

[56] References Cited

U.S. PATENT DOCUMENTS

| | | | |
|---|---|---|---|
| 3,741,903 | 6/1973 | Evans | 252/95 |
| 3,859,350 | 1/1975 | Sahm | 252/301.32 |
| 3,994,879 | 11/1976 | Sahm | 252/301.32 |
| 4,002,423 | 11/1977 | Sahm et al. | 252/301.32 |
| 4,028,263 | 6/1977 | Gray | 252/99 |
| 4,321,165 | 3/1982 | Smith | 252/528 |
| 4,735,740 | 4/1988 | Zielske | 252/95 |
| 4,778,618 | 10/1988 | Fong | 252/186 |
| 4,822,510 | 4/1991 | Madison | 252/95 |
| 5,004,558 | 4/1991 | Dyroff | 252/95 |
| 5,030,244 | 7/1991 | Neumann | 8/526 |
| 5,055,218 | 10/1991 | Getty | 252/94 |
| 5,064,570 | 11/1991 | Rohringer | 252/301.21 |
| 5,071,632 | 12/1991 | Maeda | 423/566 |
| 5,089,166 | 2/1992 | Clements | 252/186.1 |
| 5,230,820 | 7/1993 | Reinehr et al. | 252/95 |
| 5,279,772 | 1/1994 | Eckhardt et al. | 252/558 |
| 5,326,491 | 7/1994 | Weber | 252/95 |

FOREIGN PATENT DOCUMENTS

| | | |
|---|---|---|
| 0145438 | 6/1985 | European Pat. Off. . |
| 0168204 | 1/1986 | European Pat. Off. . |
| 0233730 | 8/1987 | European Pat. Off. . |
| 0325288 | 7/1989 | European Pat. Off. . |
| 0333248 | 9/1989 | European Pat. Off. . |
| 0345765 | 12/1989 | European Pat. Off. . |
| 0395588 | 10/1990 | European Pat. Off. . |
| 0426217 | 5/1991 | European Pat. Off. . |
| 2141754 | 1/1985 | United Kingdom . |
| 2141755 | 1/1985 | United Kingdom . |

OTHER PUBLICATIONS

Ciba-Geigy Review, 1973/1, pp. 1-25 (1973).
Chem. Abst. vol. 91, 1979, (125237) pp. 96-97.
Chem. Abst. vol. 109, 1988 (112454).
JP-A-212222.
EP 0 395 588 (English Language Abstract)—WPAT.

*Primary Examiner*—Gary Geist
*Assistant Examiner*—Joseph D. Anthony
*Attorney, Agent, or Firm*—Kevin T. Mansfield

[57] ABSTRACT

A bleach dispersion of long shelf life comprising, apart from at least one peracid or salts thereof, one or more fluorescent whiteners of the bis(benzofuranyl) type and the preparation and use of this bleach dispersion for the simultaneous bleaching and whitening of household and industrial fabrics at temperatures starting from +10° C. or higher are described.

17 Claims, No Drawings

BLEACH DISPERSION OF LONG SHELF LIFE

The invention relates to a bleach dispersion of long shelf life comprising, apart from at least one peracid or salts thereof, one or more fluorescent whiteners of the bis(benzofuranyl) type and to the preparation and use of this bleach dispersion for the simultaneous bleaching and whitening of household and industrial fabrics at temperatures starting from +10° C. or higher.

Combinations of fluorescent whiteners with peracids are already being used in many cases. Owing to the desire not to wash coloured textiles separately any longer and for reasons of saving energy, in many countries, laundry is no longer washed or bleached at 90° to 95° C. or at the boil but instead at lower temperatures. In order to obtain good bleaching effects at these temperatures, it became necessary ,to switch to peracids having a stronger bleaching effect (EP-A-145 438, GB-2 141 754, GB-2 141 755, U.S. Pat. NO. 4,028,263). In particular those bleaches, for example liquid bleach formulations, which are added separately to the wash bath, are being offered. These products contain high concentrations of oxidising agents, for example peracids, which may destroy conventional fluorescent whiteners in the wash bath.

It has now been found that bis(benzofuranyl) compounds substituted on the heterocyclic ring have superior fluorescent whitening properties and show excellent stability in liquid bleach dispersions against the peracids added. These specific: bis(benzofuranyl) compounds can be incorporated in concentrated bleaches. They exhibit good whitening effects therein and are stable at 20° C. for months or are degraded at most in an amount which does not interfere in practice.

Accordingly, the invention relates to an aqueous bleach dispersion of long shelf life comprising 2 to 70% by weight, relative to the total weight of the formulation, of one or more peracids, peracid-forming systems or salts thereof, and 0.01 to 1% by weight of a fluorescent whitener or a mixture of fluorescent whiteners, wherein the fluorescent whiteners are bis(benzofuranyl) whiteners of the formula (1)

(1)

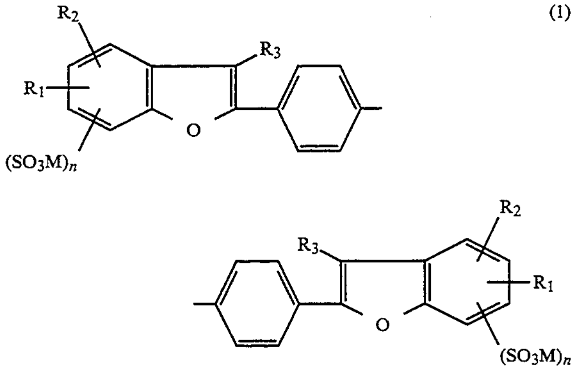

in which $R_1$ and $R_2$, independently of one another, are hydrogen, $C_1$–$C_4$alkyl, $C_1$–$C_4$alkoxy, halogen, benzyloxy or phenoxy, $R_3$ is $C_1$–$C_4$alkyl, halogen or phenyl, M is hydrogen or an equivalent of a non-chromophoric cation and n is 1 to 4.

Preferred bleaches comprise a fluorescent whitener of the formula (2)

(2)

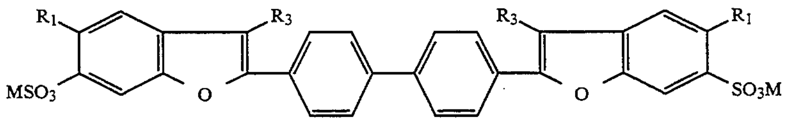

in which $R_1$ is hydrogen, $C_1$–$C_4$alkyl, $C_1$–$C_4$alkoxy, halogen, benzyloxy or phenoxy and $R_3$ is $C_1$–$C_4$alkyl, halogen or phenyl and M is hydrogen, an alkali metal ion or an ammonium ion.

Examples of $C_1$–$C_4$alkyl and $C_1$–$C_4$alkoxy are methyl, ethyl, butyl and tert-butyl and methoxy, ethoxy and butoxy. For practical considerations, sodium and potassium are preferred as alkali metal ions.

In particularly preferred fluorescent whiteners of the formula (2), $R_1$ is hydrogen, methyl or methoxy and $R_3$ is methyl, ethyl or phenyl, of particular importance being the fluorescent whiteners of the formulae (3), (4) and (5)

(3)

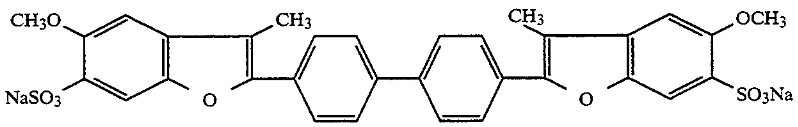

(4)

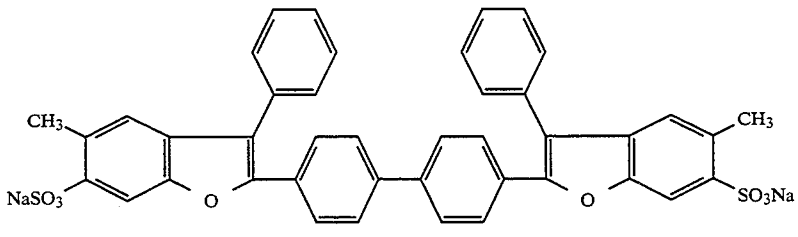

-continued

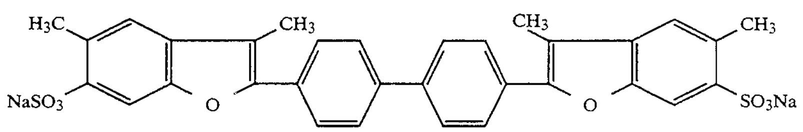

(5)

The fluorescent whitener content is 0.01 to 1% by weight, preferably 0.05 to 0.25% by weight, relative to the total weight of the formulation.

The fluorescent whiteners of the formulae (1) to (5) are known and can be prepared, for example, according to EP-A-395 588.

The peracids, peracid-forming systems and salts thereof present in the bleach dispersions are preferably added in an amount of 2 to 70% by weight and particularly preferably in an amount of 5 to 40% by weight, relative to the total weight of the formulation.

Suitable peracids are all inorganic peracids, such as perborates, persulfates and, in particular, hydrogen peroxide.

However, it is also possible to use organic systems containing one or more peroxide groups, for example

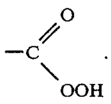

.

Examples of these are:

diperoxyalkyldicarboxylic acids of the general formula

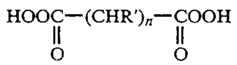

in which R' is hydrogen or $C_1$–$C_4$alkyl and n is 5 to 15, phthaloaminoperacids such as described, for example, in EP-A-325 288, sulfonylperacids such as described, for example, in U.S. Pat. No. 5,004,558 and U.S. Pat. No. 4,822,510, or other customary peracids such as described, for example, in EP-A-168 204, EP-A-233 730, U.S. Pat. No. 5,055,218 or U.S. Pat. No. 5,059,344.

Of these, hydrogen peroxide and diperoxyalkyldicarboxylic acids, such as diperoxydodecanedicarboxylic acid, or a mixture thereof are preferred.

Instead of the peracids or in support thereof, peracid-forming systems can be added. Examples of these are tetraacetylethylenediamine (TAED), salts of nonoyloxybenzenesulfonate (NOBS), of iso-nonoyloxybenzenesulfonate (i-NOBS) or compounds such as mentioned in DE-A-3 731 506, U.S. Pat. No. 4,778,618, EP-A-426 217, U.S. Pat. No. 4,735,740 or EP-A-333 248.

For activation of the peracids, 0.01 to 5% by weight and preferably 0.05 to 2% by weight, relative to the total weight of the formulations, of a catalyst or a catalyst mixture can be added.

Examples of suitable catalysts are transition metal compounds, such as copper compounds, cobalt compounds and manganese compounds. Examples which may be mentioned are $CuSO_4$, cobalt amine complexes or manganese complexes containing multidentate ligands.

The bleach dispersion can in addition comprise further additives, such as:

a) 0 to 10% by weight, preferably 3 to 7% by weight, of one or more sulfonates, b) 0 to 10% by weight, preferably 1 to 8% by weight, of one or more nonionic surfactants, c) 0 to 5% by weight, preferably 0 to 3% by weight, of one or more fatty acids and d) 0 to 1% by weight, preferably 0 to 0.5% by weight, of one or more phosphonates.

Examples of suitable sulfonates are water-soluble salts of alkylbenzenesulfonates, paraffin sulfonates, α-olefin sulfonates, fatty acid monoglycerol sulfonates, 2-acyloxyalkane-1-sulfonates and β-alkyloxyalkanesulfonates, such as mentioned in GB-A-2 141 754. Examples which may be mentioned are sodium pentadecanesulfonate or dioctyl sulfosuccinate and, in particular, $C_9$–$C_{15}$alkylbenzenesulfonates.

Examples of nonionic surfactants which may be mentioned are compounds formed by condensation of ethylene oxide, propylene oxide or a mixture of both with a hydrocarbon carrying an active hydrogen atom.

Examples of hydrocarbons containing an active hydrogen atom are:

low molecular weight aliphatic polyols, saturated and/or unsaturated fatty alcohols having 8 to 22 C atoms, alkylphenols having 4 to 12 C atoms in the alkyl moiety, hydroxybiphenyls, saturated and unsaturated fatty amines having 8 to 22 C atoms, saturated and unsaturated fatty acids having 8 to 22 C atoms, or saturated and unsaturated fatty acid N,N-bis(hydroxyalkyl)amides, preferably 4 to 100 mol of ethylene oxide and/or propylene ,oxide being present per mole of the compounds mentioned. Examples which may be mentioned are fatty alcohol ethoxylates. However, it is also possible to use mixtures Of these reaction products with one another. These mixtures are obtained by mixing individual reaction products or directly by ethoxylation of a mixture of the compounds on which the reaction products are based.

Furthermore, alkyl monoglucosides or alkyl polyglucosides or alkylene monoglucosides or alkylene polyglucosides are suitable. They preferably contain alkyl or alkylene groups of 9 to 15 carbon atoms and 1–10 glucoside units. Examples of these are nonyl diglucoside and allyl($C_{12}C_{15}$) poly(1–10)glucoside. Furthermore, sorbitan esters, for example polyoxyethylenesorbitan monopalmitate, fatty acid ethanolamides, for example coconut fatty acid diethanolamide and fatty acid ethanolamine oxides, for example tetradecylamine oxide, can be used.

The fatty acids which are used can be saturated and unsaturated carboxylic acids, for example oleic, capric, lauric, myristic, coconut, palm kernel acid or salts thereof, for example sodium salts, potassium salts or ammonium salts, coconut fatty acid derivatives being particularly preferred.

Examples of the group of phosphonates and polyphosphonates are aminotrimethylphosphonic acid, aminotriethylphosphonic acid, ethylenediaminetetramethylphosphonic acid and diethylenediaminetetramethylphosphonic acid and compounds such as described in U.S. Pat. No. 4,321,165.

Apart from these additives, further additives are possible, such as further surfactants, emulsifiers, thickeners, foam-controlling agents, stabilisers, odour-improving agents, sequestering agents, salts or dyes.

The bleach dispersion is prepared by mixing the fluorescent whitener or whiteners as a moist press cake or a dry powder with one or more peracids G,r peracid-forming systems together with water and, if desired, further additives and homogenising the mixture. The bleach dispersion thus obtained is stable for months and does not form sediments.

The combination according to the invention of the peracids with the specific whiteners makes it possible to offer a liquid bleach dispersion which is in accordance with the customary standard, can be used starting from +10° C., preferably in the range from +10° C. to +60° C. and particularly preferably in the range from +15° C. to +40° C. and additionally has increased shelf life.

In the examples which follow, parts and percentages are by weight. The temperature is given in degrees centigrade.

The examples which follow illustrate the invention without limiting it thereto.

EXAMPLE 1

A formulation of the following composition is prepared:

6.2 parts of secondary alkanesulfonate (Hostapur SAS 60®)
1.6 parts of nonionic alcohol ethoxylate (Tergitol 15-S-7®)
1.6 parts of coconut fatty acid derivative (Edenor K12/28®)
7.5 parts of hydrogen peroxide
5.0 parts of diperoxydodecanedicarboxylic acid
2.4 parts of sodium sulfate
0.13 part of phosphonate (Sequion 40Na32®)
0.1 part of the fluorescent whitener of the formula (3)

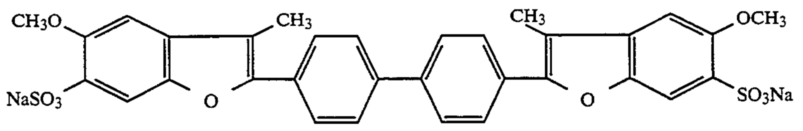

(3)

75.47 parts of water.

This is done by adding all components except for the peracid and the fluorescent whitener to heated deionised water with stirring. After cooling to room temperature, the peracid and the fluorescent whitener are added.

The fluorescent whitener can be incorporated without any visible sedimentation and, after neutralisation of the oxidising agent with hydrosulfite, its amount as determined by spectroscopy is up to 100% of the amount used. The dispersion obtained is stable.

EXAMPLE 2

Example 1 is repeated, except that the fluorescent whitener used is one of the formula (4)

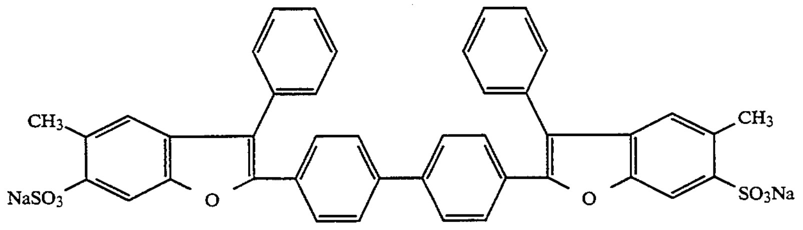

(4)

The same result is obtained.

EXAMPLE 3

The bleach dispersions according to Examples 1 and 2 are stored at a temperature of 20° C. for 14 days with the exclusion of light. Determination of the fluorescent whitener content gives in both cases a content of 100% of the initial value.

EXAMPLE 4 (comparative example)

Example 1 is repeated, except that the fluorescent whitener used is one of the formula (6)

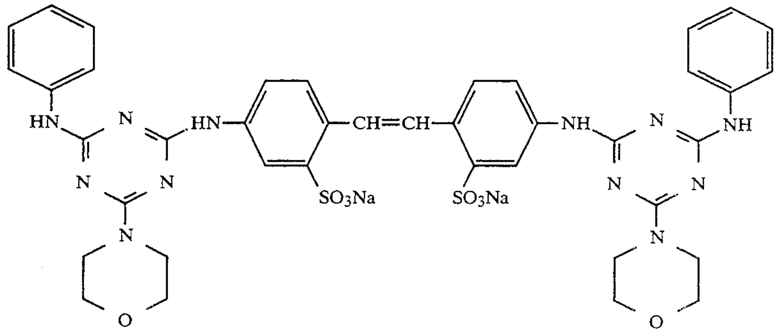

(6)

(EP-A-345 765). After storage at 20° C. for 14 days with the exclusion of light, the remaining fluorescent whitener content is only 15% of the initial value.

EXAMPLE 5

Examples 1, 2 and 4 are repeated, except that the formulation is stored at 37° C. Determination of the fluorescent whitener content gives the values listed in Table 1.

TABLE 1

| Fluorescent whitener | Fluorescent whitener content after 14 days at 37° C. |
|---|---|
| (3) | 70% |
| (4) | 80% |
| (6) | 0% |

EXAMPLE 6

Example 1 is repeated, except that the fluorescent whitener used is one of the formula (5)

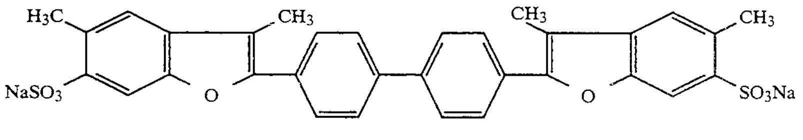

(5)

After 3 days at 26° C., the fluorescent whitener content is 85% of the initial amount.

What is claimed is:

1. An aqueous bleach dispersion having a shelf life of at least 14 days at 20° C. comprising 2 to 70% by weight, relative to the total weight of the formulation, of one or more peracids, peracid-forming systems or salts thereof and 0.01 to 1% by weight of a fluorescent whitener or a mixture of fluorescent whiteners, wherein the fluorescent whitener is a bis(benzofuranyl) whitener of the formula (1)

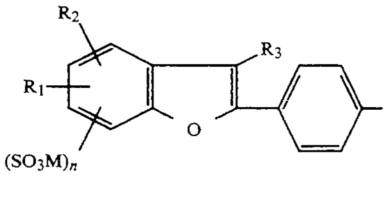

(1)

-continued

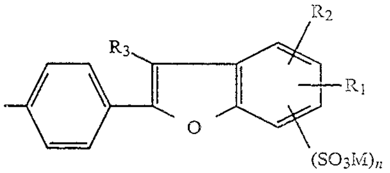

in which $R_1$ and $R_2$, independently of one another, are hydrogen, $C_1$–$C_4$alkyl, $C_1$–$C_4$alkoxy, halogen, benzyloxy or phenoxy, $R_3$ is $C_1$–$C_4$alkyl, halogen or phenyl, M is hydrogen or an equivalent of a nonchromophoric cation and n is 1 to 4.

2. A bleach dispersion of long shelf life according to claim 1, wherein the fluorescent whitener content is 0.05 to 0.25% by weight, relative to the total weight of the formulation.

3. A bleach dispersion of long shelf life according to claim 1, wherein the content of peracids, peracid-forming systems or salts thereof is 5 to 40% by weight, relative to the total weight of the formulation.

4. A bleach dispersion of long shelf life according to claim 1, wherein the peracid-forming systems used are tetraacetylethylenediamine (TAED), salts of nonoyloxybenzenesulfonate (NOBS), of iso-nonoyloxybenzenesulfonate (i-NOBS) or sulfonatophenyl benzoates.

5. A bleach dispersion of long shelf life according to claim 1, which comprises, relative to the total weight of the formulation, a) 5 to 10% by weight of hydrogen peroxide, b) 3 to 7% by weight of diperoxydodecanedicarboxylic acid, c) 0.05 to 0.25% by weight of a fluorescent whitener of the formulae (3), (4) or (5)

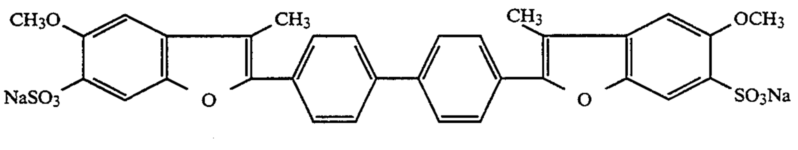

(3)

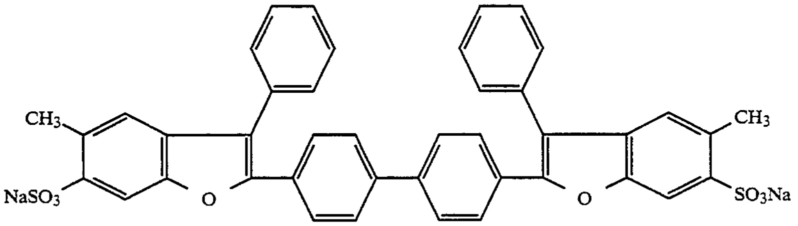

(4)

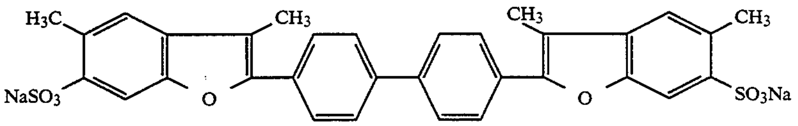

(5)

d) 0 to 7% by weight of a secondary alkyl sulfonate,
e) 1 to 8% by weight of a nonionic alcohol ethoxylate,
f) 0 to 3% by weight of a coconut fatty acid derivative,
g) 0 to 0.5% by weight of a phosphonate.

6. A bleach dispersion of long shelf life according to claim 1, which comprises further additives, selected from surfactants, emulsifiers, thickeners, foam-controlling agents, stabilisers, odour-improving agents, sequestering agents, salts or dyes.

7. A bleach dispersion of long shelf life according to claim 1, which comprises a fluorescent whitener of the formula (2)

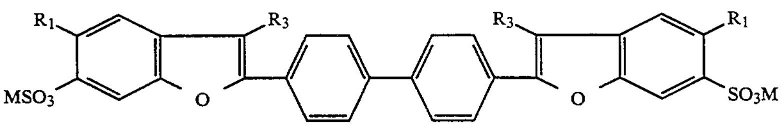

(2)

in which $R_1$ is hydrogen, $C_1$-$C_4$alkyl, $C_1$-$C_4$alkoxy, halogen, benzyloxy or phenoxy and $R_3$ is $C_1$-$C_4$alkyl, halogen or phenyl and M is hydrogen, an alkali metal ion or an ammonium ion.

8. A bleach dispersion of long shelf life according to claim 7, which comprises a fluorescent whitener of the formula (2)

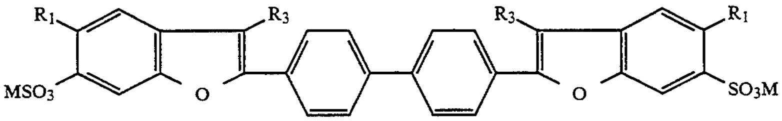

(2)

in which R 1 is hydrogen, methyl or methoxy and $R_3$ is methyl, ethyl or phenyl and M is hydrogen or an alkali metal ion.

9. A bleach dispersion of long shelf life according to claim 8, which comprises a fluorescent whitener of the formula (3)

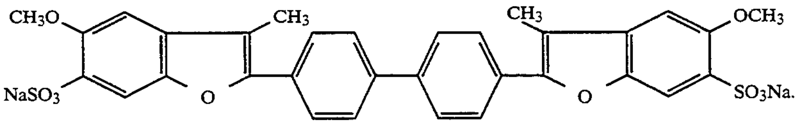

(3)

10. A bleach dispersion of long shelf life according to claim 8, which comprises a fluorescent whitener of the formula (4)

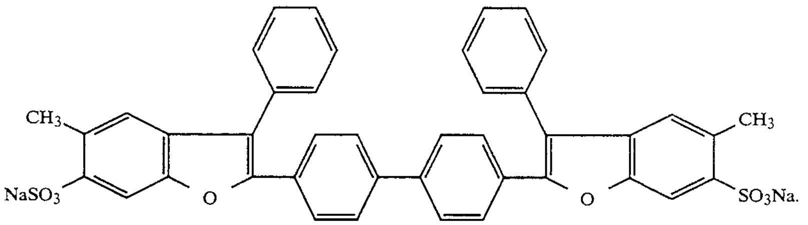

(4)

11. A bleach dispersion of long shelf life according to claim 8, which comprises a fluorescent whitener of the formula (5)

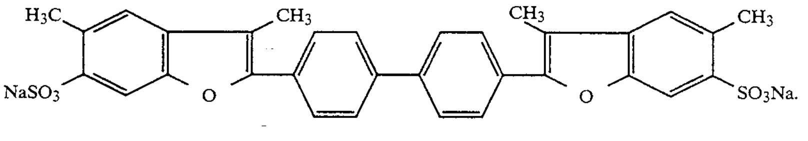

(5)

12. A bleach dispersion of long shelf life according to claim 1, wherein the peracids or salts thereof used are perborates, persulfates, hydrogen peroxide, diperoxyalkyldicarboxylic acids, phthaloaminoperacids or sulfonyl peracids.

13. A bleach dispersion of long shelf life according to claim 12, wherein the peracids used are hydrogen peroxide, diperoxydodecanedicarboxylic acid or a mixture of both.

14. A bleach dispersion of long shelf life according to claim 1, which contains 0.01 to 5% by weight, relative to the total weight of the formulation, of a catalyst or a catalyst mixture.

15. A bleach dispersion of long shelf life according to claim 14, which contains 0.05 to 2% by weight, relative to the total weight of the formulation, of a catalyst or a catalyst mixture.

16. A bleach dispersion of long shelf life according to claim 14, wherein the catalyst is selected from the group of transition metal compounds.

17. A bleach dispersion of long shelf life according to claim 16, wherein the catalyst is a copper compound, cobalt compound or manganese compound.

* * * * *